(12) United States Patent
Lee et al.

(10) Patent No.: US 10,792,635 B2
(45) Date of Patent: Oct. 6, 2020

(54) DISTRIBUTOR AND DOWN FLOW CATALYTIC REACTOR COMPRISING SAME

(71) Applicant: LG CHEM, LTD., Seoul (KR)

(72) Inventors: Jun Young Lee, Daejeon (KR); Young Soo Song, Daejeon (KR); Ye Hoon Im, Daejeon (KR)

(73) Assignee: LG CHEM, LTD., Seoul (KR)

( * ) Notice: Subject to any disclaimer, the term of this patent is extended or adjusted under 35 U.S.C. 154(b) by 71 days.

(21) Appl. No.: 15/749,698

(22) PCT Filed: Aug. 23, 2016

(86) PCT No.: PCT/KR2016/009287
§ 371 (c)(1),
(2) Date: Feb. 1, 2018

(87) PCT Pub. No.: WO2017/039206
PCT Pub. Date: Mar. 9, 2017

(65) Prior Publication Data
US 2018/0229199 A1 Aug. 16, 2018

(30) Foreign Application Priority Data
Aug. 28, 2015 (KR) .................. 10-2015-0121688

(51) Int. Cl.
*B01J 8/02* (2006.01)
*B01J 4/00* (2006.01)
*B01J 19/26* (2006.01)

(52) U.S. Cl.
CPC .............. *B01J 8/0278* (2013.01); *B01J 4/00* (2013.01); *B01J 8/02* (2013.01); *B01J 8/025* (2013.01);
(Continued)

(58) Field of Classification Search
None
See application file for complete search history.

(56) References Cited

U.S. PATENT DOCUMENTS 3,218,249 A 11/1965 Ballard et al.
4,140,625 A * 2/1979 Jensen .................. B01J 8/0492
208/146

(Continued)

FOREIGN PATENT DOCUMENTS

CN 1630549 A 6/2005
EP 0848974 A2 6/1998
(Continued)

*Primary Examiner* — Jennifer A Leung
(74) *Attorney, Agent, or Firm* — Dentons US LLP

(57) ABSTRACT

The present invention relates to a distributor and a down flow catalytic reactor comprising same, and according to one aspect of the present invention, provides a distributor comprising: an inside downcomer which has a first flow space; an outside downcomer which is disposed so as to surround at least some area of the inside downcomer, and has a second flow space partitioned from the first flow space of the inside downcomer; and a cap which has a plurality of slots and is mounted on the inside or the outside downcomer so as to enable a fluid that has passed through the slots to flow to at least one flow space among the first flow space and the second flow space.

19 Claims, 4 Drawing Sheets

(52) U.S. Cl.
CPC ...... *B01J 19/26* (2013.01); *B01J 2208/00938* (2013.01)

(56) References Cited

U.S. PATENT DOCUMENTS

| | | | | |
|---|---|---|---|---|
| 4,526,757 | A | * | 7/1985 | Gupta .................... B01J 8/0492 137/132 |
| 5,158,714 | A | | 10/1992 | Shih et al. |
| 5,799,877 | A | | 9/1998 | Gupta et al. |
| 5,942,162 | A | * | 8/1999 | Gamborg ............... B01J 8/0492 261/109 |
| 6,098,965 | A | * | 8/2000 | Jacobs ..................... B01D 3/20 261/114.2 |
| 6,183,702 | B1 | | 2/2001 | Nguyen et al. |
| 7,473,405 | B2 | * | 1/2009 | Kemoun .................. B01J 4/002 261/96 |
| 8,695,953 | B2 | * | 4/2014 | Xu ......................... B01D 3/008 261/110 |
| 2004/0065966 | A1 | | 4/2004 | Muller |
| 2012/0014849 | A1 | * | 1/2012 | Killen .................... B01J 8/0453 422/607 |
| 2012/0138175 | A1 | * | 6/2012 | Xu ......................... B01D 3/008 137/599.01 |
| 2014/0364650 | A1 | * | 12/2014 | Haroun ................... B01D 3/20 568/300 |

FOREIGN PATENT DOCUMENTS

| | | |
|---|---|---|
| EP | 1846150 B1 | 8/2010 |
| EP | 3342482 A1 | 7/2018 |
| JP | 06-508063 A | 9/1994 |
| JP | 10-230156 A | 9/1998 |
| JP | 2005-519747 A | 7/2005 |
| JP | 2008-528248 A | 7/2008 |
| KR | 10-2001-0098536 A | 11/2001 |
| KR | 10-2001-0098537 A | 11/2001 |
| KR | 10-2005-0004804 A | 1/2005 |
| KR | 10-2014-0088175 A | 7/2014 |
| WO | 02/051530 A1 | 7/2002 |
| WO | 02/085504 A1 | 10/2002 |
| WO | 2017/039207 A1 | 3/2017 |

* cited by examiner

[Figure 1]
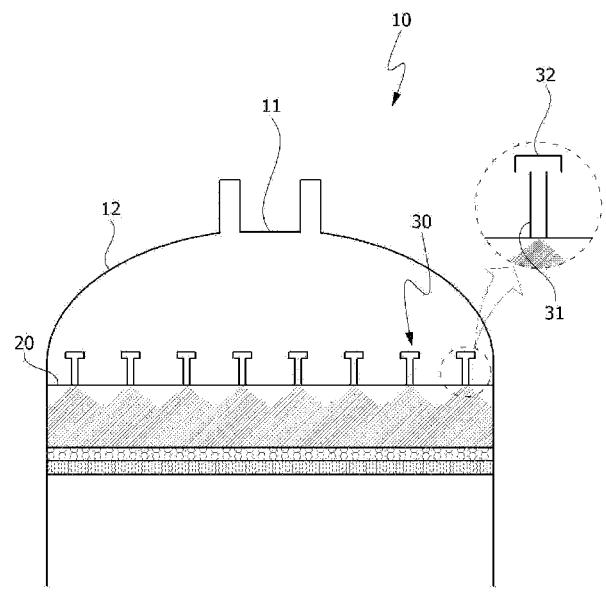
[Figure 2]
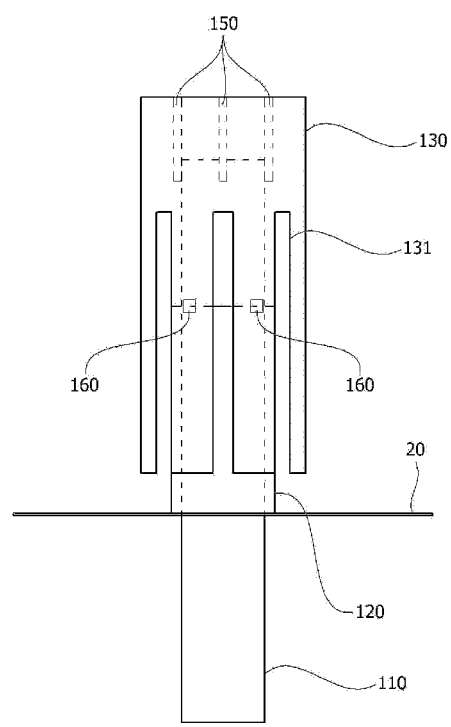

[Figure 3]
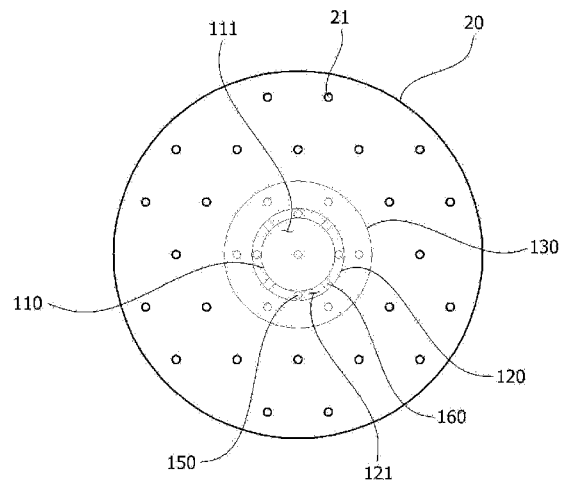
[Figure 4]
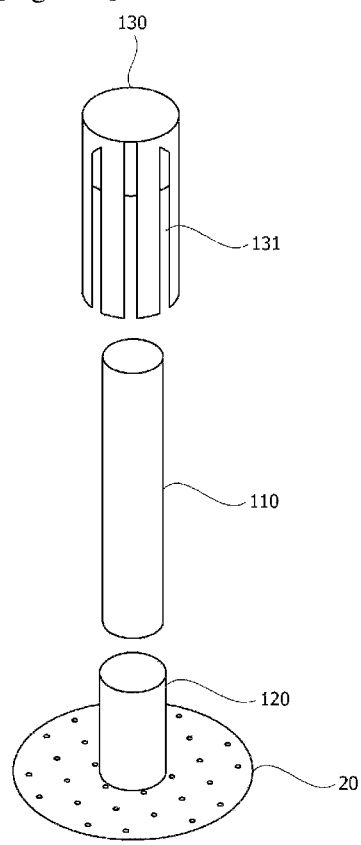

[Figure 5]
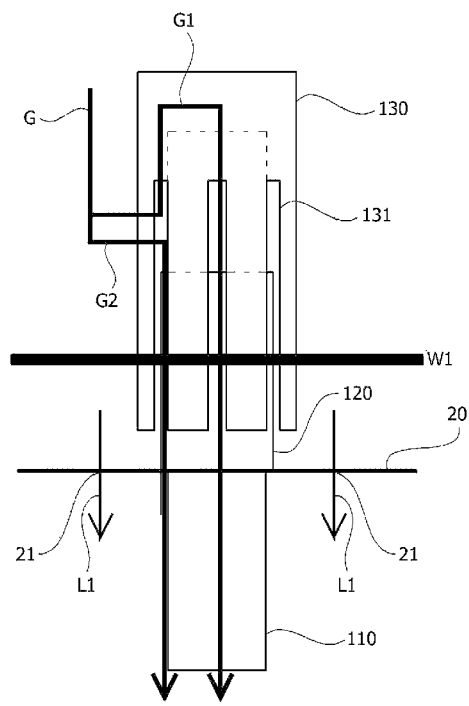
[Figure 6]
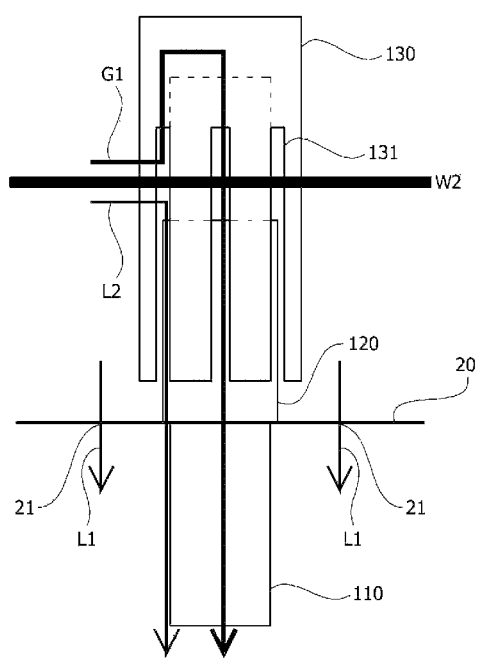

[Figure 7]
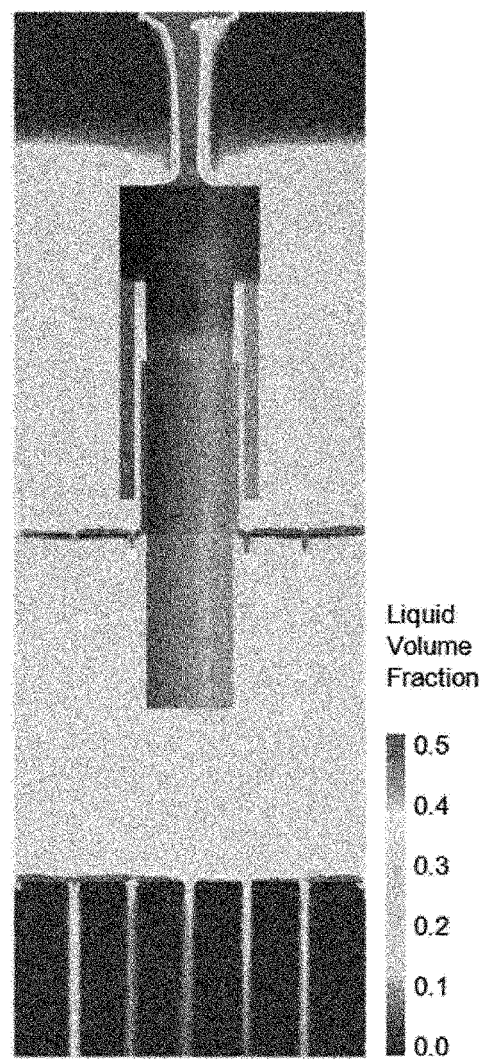

US 10,792,635 B2

DISTRIBUTOR AND DOWN FLOW CATALYTIC REACTOR COMPRISING SAME

TECHNICAL FIELD

The present invention relates to a distributor and a down flow catalytic reactor comprising the same.

This application is the national stage of International Application No. PCT/KR2016/009287 filed on Aug. 23, 2016, and claims the benefit of Korean Application No. 10-2015-0121688, filed on Aug. 28, 2015, all of which are hereby incorporated by reference in their entirety for all purposes as if fully set forth herein.

BACKGROUND ART

In general, a down flow catalytic reactor involves a gas-liquid mixing process. In such a process, a liquid phase is mixed with a gas or vapor phase, and while the mixture passes over a solid packed bed in the reactor, the reaction takes place. In the reactor, the gas and liquid phases must be properly mixed and uniformly distributed before contacting the solid phase catalyst packed bed.

FIG. 1 is a conceptual diagram showing a general down flow catalytic reactor (10).

The reactor (10) comprises a housing (12) having an inlet (11), a dispersion tray (20) disposed in the housing (12) and a plurality of distributors (30) provided in the dispersion tray (20).

Here, the dispersion tray (20) has a plurality of holes through which the liquid phase can pass.

In addition, the distributor (30) comprises a chimney (31) and a cap (32) provided so as to surround the chimney (31). The chimney (31) has a cylindrical structure having a hollow portion into which the gas phase can enter via the upper part. Also, the gas flows through the space between the chimney (31) and the cap (32) and flows down the dispersion tray (20) through the chimney (31). On the other hand, when the liquid level on the dispersion tray (20) becomes high, the inlet of the chimney (31) becomes clogged, and the gas does not flow down the dispersion tray (20) through the chimney (31). Therefore, there is a problem that distribution and dispersion efficiency is lowered.

DISCLOSURE

Technical Problem

It is a problem to be solved by the present invention to provide a distributor having high mixing and distribution efficiency and a down flow catalytic reactor comprising the same.

Technical Solution

In order to solve the above-described problem, according to one aspect of the present invention, there is provided a distributor comprising an inside downcomer which has a first flow space, an outside downcomer which is disposed so as to surround at least some area of the inside downcomer and has a second flow space partitioned from the first flow space of the inside downcomer and a cap which has a plurality of slots and is mounted on the inside or outside downcomer so that a fluid passing through the slots can flow into at least one flow space among the first flow space and the second flow space.

In addition, according to another aspect of the present invention, there is provided a down flow catalytic reactor comprising a housing having an inlet, a dispersion tray disposed inside the housing and having a plurality of flow holes, and a plurality of distributors mounted on the dispersion tray.

Each distributor comprises an inside downcomer which has a first flow space, an outside downcomer which is disposed so as to surround at least some area of the inside downcomer and has a second flow space partitioned from the first flow space of the inside downcomer and a cap which has a plurality of slots and is mounted on the inside or outside downcomer so that a fluid passing through the slots can flow into at least one flow space among the first flow space and the second flow space.

In addition, when the liquid-gas mixture is supplied into the housing in the down flow catalytic reactor, the gas flowing through the slots flows into the first flow space and the gas or the liquid passing through the slots depending on the liquid level on the dispersion tray flows into the second flow space.

Advantageous Effects

As described above, the distributor related to one embodiment of the present invention and the down flow catalytic reactor comprising the same have high mixing efficiency and distribution efficiency.

BRIEF DESCRIPTION OF DRAWINGS

FIG. 1 is a conceptual diagram showing a general down flow catalytic reactor.

FIG. 2 is a conceptual diagram showing a distributor related to one embodiment of the present invention.

FIG. 3 is a cross-sectional view of the distributor shown in FIG. 2.

FIG. 4 is an exploded perspective view of the distributor shown in FIG. 2.

FIGS. 5 and 6 are conceptual diagrams for explaining one operating state of the distributor related to the present invention.

FIG. 7 is a simulation result of the distributor shown in FIG. 2.

MODE FOR INVENTION

Hereinafter, a distributor according to one embodiment of the present invention and a down flow catalytic reactor comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 2 is a conceptual view showing a distributor related to one embodiment of the present invention, FIG. 3 is a cross-sectional view of the distributor shown in FIG. 2, and FIG. 4 is an exploded perspective view of the distributor shown in FIG. 2.

FIGS. 5 and 6 are conceptual diagrams for explaining one operating state of the distributor related to the present invention, and FIG. 7 is a simulation result of the distributor shown in FIG. 2.

The down flow catalytic reactor related to one embodiment of the present invention comprises a housing (12) (see FIG. 1) having an inlet (11) (see FIG. 1) and a dispersion tray disposed inside the housing (12) and having a plurality of flow holes (21), and a plurality of distributors (100) mounted on the dispersion tray (20).

The distributor (100) related to one embodiment of the present invention comprises an inside downcomer (110) and an outside downcomer (120), and a cap (130).

The inside downcomer (110) has a first flow space (111). The inside downcomer (110) has a first diameter and a first height. In addition, the inside downcomer (110) has a hollow cylinder shape. Furthermore, the first flow space (111) is provided such that both end parts are each opened along the height direction of the inside downcomer (110).

The outside downcomer (120) is disposed to surround at least some area of the inside downcomer (110). Here, the outside downcomer (120) is provided to have a second diameter larger than the first diameter and a second height lower than the first height. The outside downcomer (120) has a second flow space (121) partitioned from the first flow space (111). The second flow space (121) may be defined as a space between the outer peripheral surface of the inside downcomer (110) and the inner peripheral surface of the outside downcomer (120). For example, the first flow space (111) may have a circular cross section, and the second flow space (121) may have a ring-shaped cross section. In addition, the outside downcomer (120) has a hollow cylinder shape. Furthermore, the second flow space (121) is provided such that both end parts are each opened along the height direction of the outside downcomer (120).

Also, the inside downcomer (110) and the outside downcomer (120) may be disposed such that each center axis is coaxially positioned.

The cap (130) has a plurality of slots (131). In one example, the plurality of slots (131) may be provided along the circumferential direction of the cap (130), respectively. Also, each of the slots (131) may be elongated along the height direction of the cap (130). The height direction of the cap (130) and the height direction of the downcomer (110, 120) herein are used to mean the same direction.

The cap (130) may be mounted on the inside downcomer (110) or the outside downcomer (120). In such a structure, the cap (130) is mounted on the inside downcomer (110) or the outside downcomer (120) so that the fluid passing through the slots (131) can flow into at least one flow space among the first flow space (111) and the second flow space (121).

For example, when the cap (130) is mounted and fixed to the inside downcomer (110), the distributor (100) may comprise a first fixing element (130) for fixing the cap (130) and the inside downcomer (110). The first fixing element (150) may be provided in a number of elements. For example, the first fixing element (150) may have the same shape as a column, and connect the cap (130) and the inside downcomer (110) at regular intervals (for example, 90°) along the circumference direction of the inside downcomer (110). At this time, the first fixing element (150) may be provided so as to fix the cap (130) and the inside downcomer (110) in a spaced state.

In addition, the distributor (100) may comprise a second fixing element (160) for fixing the inside downcomer (110) and the outside downcomer (120). The second fixing element (160) may be provided in a number of elements. For example, the first fixing element (150) may have the same shape as a column, and connect the inside downcomer (10) and the outside downcomer (120) at regular intervals (for example, 90°) along the circumference direction of the inside downcomer (110). At this time, the second fixing element (160) may be provided so as to fix the inside downcomer (110) and the outside downcomer (120) in a spaced state.

In addition, the cap (130) may be disposed to surround the outside downcomer (120) and at least some area of the inside downcomer (110), respectively.

On the other hand, the inside downcomer (110) may be disposed to penetrate the dispersion tray (20) in the height direction. Also, the outside downcomer (120) may be mounted to the dispersion tray (20). Also, the inside downcomer (110) may be disposed so that the height of the inside downcomper (110) positioned on the dispersion tray (20) is higher than the height of the outside downcomer (120).

The slot (131) is formed along the height direction of the cap (130). Also, the plurality of slots (131) may be formed at regular intervals along the circumferential direction of the cap (130). Each slot (131) may be elongated along the height direction of the cap (130). An outer fluid can be introduced into the cap (130) through the slots (131) and then the introduced fluid can move into at least one flow space among the first flow space (111) of the inside downcomer (110) and the second flow space (121) of the outside downcomer (120). In addition, it is preferred that the slots (131) are provided to be opened from the lower end of the cap (130) to a height between the inside downcomer (110) and the outside downcomer (120). Furthermore, the cap (130) may be disposed so that the lower end is spaced apart from the dispersion tray (20).

The distributor (100) has a first flow channel connecting the slot (131) and the first flow space (111) and a second flow channel connecting the slot (131) and the second flow space (121). Here, the first flow channel may be formed to be longer than the length of the second flow channel, based on a specific position of the slot (131).

Referring to FIGS. 5 and 6, when a liquid-gas mixture is supplied into the housing, the liquid accumulates on the dispersion tray (20) and the liquid level on the dispersion tray (20) can be raised.

Referring to FIG. 5, when the liquid level (W1) on the dispersion tray (20) is lower than the height of the outside downcomer (120), the gas (G) flows down the dispersion tray (20) through at least one of the first flow channel (see G1) and the second flow channel (see G2).

Referring to FIG. 6, when the liquid-gas mixture is supplied into the housing and the liquid level (W2) on the dispersion tray (20) is higher than the height of the outside downcomer (120), the gas flows down the dispersion tray (20) through the first flow channel (see G1) and the liquid flows down the dispersion tray (20) through the second flow channel (see L2). Specifically, when the liquid level (W2) on the dispersion tray (20) is higher than the height of the outside downcomer (120) and lower than the height of the inside downcomer (120), the gas flows down the dispersion tray (20) through the first flow channel (see G1) and the liquid flows down the dispersion tray (20) through the second flow channel (see L2).

Of course, when the liquid-gas mixture is supplied into the housing and the liquid level (W2) on the dispersion tray (20) is higher than the height of the inside downcomer (120), the liquid will flow down the dispersion tray (20) through the first flow channel and the second flow channel.

On the other hand, the unexplained symbol L1 represents a liquid flow moving down the dispersion tray (20) through the flow holes (21) of the dispersion tray (20).

To sum up, when the liquid-gas mixture is supplied into the housing, the down flow catalytic reactor is provided so that the gas passing through the slots (131) flows into the first flow space (111) and the gas or the liquid passing through the slots (131) depending on the liquid level on the dispersion tray (20) flows into the second flow space (121).

The preferred example of the present invention as described above is disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

The distributor related to one embodiment of the present invention and the down flow catalytic reactor comprising the same, have high mixing efficiency and distribution efficiency.

The invention claimed is:

1. A distributor comprising an inside downcomer which has a first flow space;
an outside downcomer which is disposed so as to surround at least some area of the inside downcomer and has a second flow space partitioned from the first flow space of the inside downcomer; and
a cap which has a plurality of slots and is mounted on said inside or outside downcomer, wherein the cap is defined by walls that are spaced apart from and do not contact said inside or outside downcomer so that a fluid passing through the slots can flow into the first flow space and the second flow space.

2. The distributor according to claim 1, wherein the distributor is provided so that the inside downcomer has a first diameter and a first height, and the outside downcomer has a second diameter larger than the first diameter and a second height lower than the first height.

3. The distributor according to claim 1, wherein the distributor comprises a first fixing element for fixing the cap and the inside downcomer, and the first fixing element is provided so as to fix the cap and the inside downcomer in a spaced state.

4. The distributor according to claim 1, wherein the distributor comprises a second fixing element for fixing the inside downcomer and the outside downcomer, and the second fixing element is provided so as to fix the inside downcomer and the outside downcomer in a spaced state.

5. The distributor according to claim 1, wherein the inside downcomer and the outside downcomer have each a hollow cylinder shape, and are disposed such that each center axis is coaxially positioned.

6. The distributor according to claim 1, wherein the cap is disposed to surround the outside downcomer and at least some area of the inside downcomer, respectively.

7. A down flow catalytic reactor comprising a housing having an inlet;
a dispersion tray disposed inside said housing and having a plurality of flow holes; and
a plurality of distributors mounted on said dispersion tray, wherein each distributor comprises:
an inside downcomer which has a first flow space;
an outside downcomer which is disposed so as to surround at least some area of the inside downcomer and has a second flow space partitioned from the first flow space of the inside downcomer; and
a cap which has a plurality of slots and is mounted on said inside or outside downcomer, wherein the cap is defined by walls that are spaced apart from and do not contact said inside or outside downcomer so that a fluid passing through the slots can flow into the first flow space and the second flow space.

8. The down flow catalytic reactor according to claim 7, wherein the down flow catalytic reactor is provided so that the inside downcomer has a first diameter and a first height, and the outside downcomer has a second diameter larger than the first diameter and a second height lower than the first height.

9. The down flow catalytic reactor according to claim 7, wherein the inside downcomer is disposed to penetrate the dispersion tray, and the outside downcomer is mounted to the dispersion tray.

10. The down flow catalytic reactor according to claim 7, wherein the inside downcomer is disposed so that the height of the inside downcomer positioned on the dispersion tray is higher than the height of the outside downcomer.

11. The down flow catalytic reactor according to claim 10, wherein said slots are formed along the height direction of the cap, and said slots are provided to be opened from the lower end of said cap to a height between the inside downcomer and the outside downcomer.

12. The down flow catalyst reactor according to claim 7, wherein said distributor has a first flow channel connecting the plurality of slots and the first flow space and a second flow channel connecting the plurality of slots and the second flow space.

13. The down flow catalytic reactor according to claim 12, wherein the first flow channel is formed to be longer than the length of the second flow channel, based on a specific position of the slot.

14. The down flow catalytic reactor according to claim 12, wherein when a liquid-gas mixture is supplied into the housing and the liquid level on the dispersion tray is lower than the height of the outside downcomer, the gas flows down the dispersion tray through at least one of the first flow channel and the second flow channel.

15. The down flow catalytic reactor according to claim 12, wherein when a liquid-gas mixture is supplied into the housing and the liquid level on the dispersion tray is higher than the height of the outside downcomer, the gas flows down the dispersion tray through the first flow channel and the liquid flows down the dispersion tray through the second flow channel.

16. The down flow catalytic reactor according to claim 7, wherein the down flow catalytic reactor comprises a plurality of first fixing elements for fixing the cap and the inside downcomer, and wherein the plurality of first fixing elements are provided so as to fix the cap and the inside downcomer in a spaced state.

17. The down flow catalytic reactor according to claim 7, wherein the down flow catalytic reactor comprises a plurality of second fixing elements for fixing the inside downcomer and the outside downcomer, and wherein the plurality of second fixing elements are provided so as to fix the inside downcomer and the outside downcomer in a spaced state.

18. The down flow catalytic reactor according to claim 7, wherein the inside downcomer and the outside downcomer have each a hollow cylinder shape, and are disposed such that each center axis is coaxially positioned.

19. A down flow catalytic reactor comprising a housing having an inlet, a dispersion tray disposed inside said housing and having a plurality of flow holes and a plurality of distributors mounted on said dispersion tray, wherein each distributor comprises an inside downcomer which has a first flow space;
an outside downcomer which is disposed so as to surround at least some area of the inside downcomer and has a second flow space partitioned from the first flow space of the inside downcomer; and
a cap which has a plurality of slots and is mounted on said inside or outside downcomer, wherein the cap is defined by walls that are spaced apart from and do not contact said inside or outside downcomer so that a fluid passing through the slots can flow into at least one flow space among the first flow space and the second flow space, and
wherein when a liquid-gas mixture is supplied into the housing, the gas passing through the slots flows into the first flow space and the gas or the liquid passing through the slots depending on the liquid level on the dispersion tray flows into the second flow space.

\* \* \* \* \*